Patented Jan. 27, 1953

2,626,876

UNITED STATES PATENT OFFICE 2,626,876

ANTISTATIC TREATMENT OF ARTICLES COMPRISING A VINYL RESIN AND TREATED ARTICLES

Joseph J. Carnes, Greenwich, Conn., assignor to American Cyanamid Company, New York, N. Y., a corporation of Maine No Drawing. Application August 17, 1951, Serial No. 242,433

11 Claims. (Cl. 117—138.8)

This invention relates to the treatment of shaped articles comprising a vinyl resin, that is, one or more vinyl resins. More particularly it is concerned with a method of conditioning a shaped article (e. g., in the form of a fiber, film, etc.) of a thermoplastic vinyl resin to lessen its tendency to accumulate static charges of electricity thereon, and with the products resulting from this treatment. The treatment is effected by applying to the shaped vinyl-resin article, which in a dry state normally has a tendency to accumulate static charges of electricity thereon, a volatile liquid containing a quaternary ammonium compound represented by the general formula

I

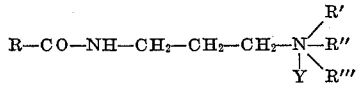

wherein R is a member of the group consisting of aliphatic and alicyclic radicals containing at least 7 carbon atoms, R' and R'' are members of the group consisting of alkyl and hydroxyalkyl radicals having from 1 to 3 carbon atoms, inclusive, R''' is a hydroxyalkyl radical having from 1 to 3 carbon atoms, inclusive, and Y is an anion.

Illustrative examples of radicals represented by R in Formula I are heptyl, octyl, nonyl, decyl, undecyl, tridecyl, heptadecyl, the residue of abietic acid, etc.; illustrative examples of radicals represented by R' and R'' are methyl, ethyl, propyl, isopropyl, hydroxyethyl, hydroxypropyl, dihydroxypropyl, etc.; illustrative examples of radicals represented by R''' are hydroxyethyl, hydroxypropyl, hydroxyisopropyl, dihydroxypropyl, etc.; illustrative examples of anions represented by Y are the halide ions (that is, Y can represent halogen, more particularly chlorine, bromine, fluorine or iodine), sulfate, sulfonate, phosphate, hydroxide, borate, cyanide, carbonate, hydrocarbonate, thiocyanate, thiosulfate, isocyanate, sulfite, bisulfite, nitrate, nitrite, oxalate, silicate, sulfide, cyanate, acetate and the other common inorganic and organic anions.

The amount of the aforesaid liquid or liquid composition containing a quaternary ammonium compound of the kind embraced by Formula I which is applied to the vinyl-resin article is such that the finished article has associated therewith from, by weight, 0.2% to 10% of the said quaternary ammonium compound, base on the weight of the dried, untreated article. The resulting article is then dried by any suitable means. The antistatic treatment is applicable to filaments, fibers, yarns, films, woven, knitted and felted fabrics, and other articles made from or containing one or more thermoplastic vinyl resins for the purpose of eliminating substantially completely (in some cases) or materially lessening or retarding (in all other cases) the tendency of such articles to accumulate charges of static electricity thereon either during the production of the article, or in connection with subsequent finishing operations, or during the use of the article.

Vinyl resins constitute a class of materials which develop or tend to to develop an electrostatic charge upon their surfaces when fibers or other articles made therefrom are subjected to friction during their production, or during the use of the finished article. Various treatments have been tried or suggested in an effort to prevent or reduce the accumulation of an electrostatic charge on the surfaces of shaped articles made from vinyl resins, but to the best of my knowledge and belief none has been entirely satisfactory. For example, it was suggested prior to my invention that vinyl resins, more particularly those which contain a substantial percentage of vinyl halide combined in the molecules, be treated with a water-dispersible compound having a polyalkylene polyamine nucleus, which nucleus has an average molecular weight of at least 300, or with a water-dispersible polyethylene imine having an average molecular weight of at least 300, in order to prevent or retard the accumulation of charges of static electricity upon the surfaces of filaments, fibers, yarns and various fabrics and other articles made from or containing such resins. Such compounds are relatively expensive and do not completely meet the requirements of the trade.

Wizon Patent No. 2,543,539 dated February 27, 1951, discloses the use of a phenylguanidine salt of an aliphatic monocarboxylic acid, which acid contains from 12 to 18 carbon atoms, inclusive, specifically phenylguanidine stearate, as an antistatic agent for application to a shaped article comprising a thermoplastic vinyl resin, e. g., fibers or yarns formed of a polymer or copolymer of acrylonitrile; and Cresswell application Serial No. 68,371, filed December 30, 1948, now Patent No. 2,581,836, dated January 8, 1952, discloses and claims the use of certain guanylurea salts of a monoaliphatic ester of sulfuric acid, specifically guanylurea octadecyl hydrogen sulfate, for this same purpose.

The present invention is based on my discovery that filaments, fibers, yarns, films and other shaped articles composed of or containing a vinyl resin, more particularly a thermoplastic vinyl resin, e. g., polyacrylonitrile, copolymers of acrylonitrile and a different vinyl compound such, for instance, as vinyl chloride, copolymers of vinyl acetate and vinyl chloride, etc., can be conditioned so as to obviate or minimize their tendency to accumulate static charges of electricity thereon by treating them as briefly described in the first paragraph of this specification and more fully hereafter. These results, for which I have no theoretical explanation and which were wholly unobvious and unpredictable, are obtained without detrimentally affecting the color, tensile strength, elasticity, flexibility, chemical resistance, bacterial and fungal resistance, and other valuable properties of the vinyl resin, or without rendering the vinyl-resin article in any way unsuited for its intended purpose.

The quaternary ammonium compounds used in practicing the present invention are more fully described and are claimed as new chemical compounds in the copending application of Elmer W. Cook and Philip H. Moss, Serial No. 750,366, filed May 24, 1947, now Patent No. 2,589,674, dated March 18, 1952. They may be prepared, for example, as illustrated by the following Equations 1, 2 and 3 and description (4):

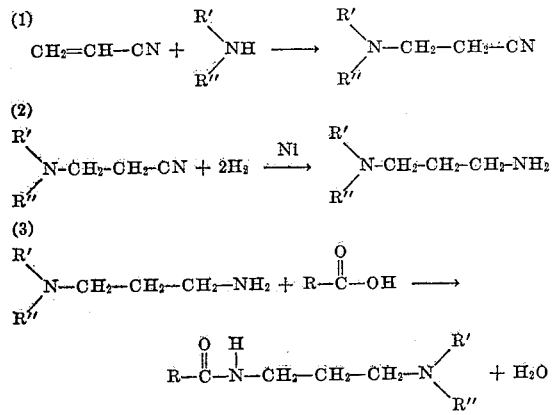

where R' and R'' have the same meanings as given above with reference to Formula I. The quaternary ammonium compounds used in practicing the present invention may be prepared from the amidopropyl amines, the preparation of which is outlined above, by (4) reaction thereof with the desired alkylating agent such as an alkyl halide, a halohydrin or ethylene oxide in the presence of a suitable acidic agent, or by other suitable methods.

Illustrative examples of compounds embraced by Formula I and which can be used in practicing my invention are the following:

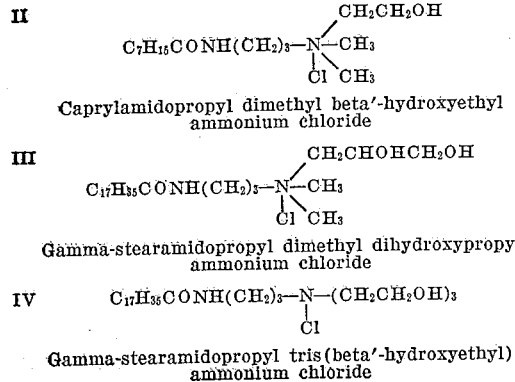

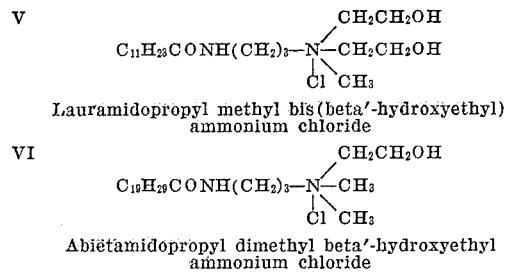

Illustrative examples of vinyl resins to which the anti-static agents employed in practicing the present invention are applicable include vinyl resins produced by the conjoint polymerization of a vinyl halide, e. g., vinyl chloride, with a vinyl ester of an aliphatic acid, e. g., vinyl acetate. Such resins are more fully described in, for example, Rugeley et al., U. S. Patent No. 2,161,766, and generally contain about 50% to about 95% by weight of combined vinyl halide in the copolymer, the remainder being a vinyl ester of an aliphatic acid. Examples of other vinyl resins to which the present invention is applicable include those formed by the conjoint polymerization of a vinyl halide, e. g., vinyl chloride, with a nitrile of an unsaturated acid, e. g., acrylonitrile, methacrylonitrile, etc.; polyvinyl chloride and other polyvinyl halides, as well as resins produced by the halogenation (e. g., chlorination) of such polyvinyl compounds; resins produced by the chlorination of copolymers of a vinyl halide with a vinyl ester of an aliphatic acid; resins produced by the conjoint polymerization of vinyl chloride or other vinyl halide with an N-alkylated imide derivative of an aliphatic acid, e. g., N-butyl maleimide; and resins produced by the conjoint polymerization of a vinyl halide, a vinyl ester of an aliphatic acid and maleic acid.

The preferred thermoplastic vinyl resins which are subjected to treatment in accordance with my invention are those in which the vinyl resin contains a substantial amount of acrylonitrile, more particularly polyacrylonitrile and thermoplastic copolymers of acrylonitrile such as those obtained by polymerizing a mixture of monomers comprising mainly, that is, a preponderant proportion by weight of acrylonitrile, and preferably those in which the acrylonitrile constitutes at least about 85% by weight of the mixture of monomers. From the foregoing it will be seen that in some cases the acrylonitrile may constitute, for example, from about 55% to about 99.5% by weight of the mixture of monomers.

Illustrative examples of monomers which may be copolymerized with acrylonitrile to yield a thermoplastic polymerization product (copolymer or interpolymer) which may be subjected to an antistatic treatment as herein described are given in, for instance, Cresswell Patent No. 2,558,730 dated July 3, 1951.

The polymeric and copolymeric acrylonitriles which are subjected to treatment may be of any suitable molecular weight, but ordinarily the molecular weight (average molecular weight) is within the range of 15,000 to 300,000 or higher, and advantageously is of the order of 35,000 or 40,000 to 140,000 or 150,000, as calculated from viscosity measurements using the Staudinger equation (reference: U. S. Patent No. 2,404,713).

The quaternary ammonium compound, or mixtures thereof, used in practicing the present invention may be applied to the thermoplastic vinyl resin by any suitable means, but preferably the individual compound or mixture of compounds is applied while dissolved or dispersed in a suitable voltaile liquid, e. g., water, ethyl alcohol, propyl alcohol, etc., mixtures of water and alcohols, or any other volatile liquid solvent or dispersion medium which will not attack or otherwise detrimentally affect the useful properties of the vinyl-resin article which is to be treated. Water is the preferred liquid medium in which the quaternary ammonium substance is dissolved or dispersed for obvious economical reasons.

The solution or dispersion of the quaternary ammonium compound may contain any suitable amount of the said compound, but ordinarily it is present in the solution or dispersion in an amount corresponding to from about 0.5% to about 5% by weight thereof. As will be readily understood by those skilled in the art, the solubility of the particular quaternary ammonium compound in the particular volatile liquid medium determines whether or not a solution (true solution) or a dispersion (including a colloidal dispersion) is formed. The term "solution" as used generally herein and in the appended claims is, therefore, intended to include within its meaning a dispersion of the specified quaternary ammonium compound in the specified liquid medium.

The solution may be applied, for example, by immersing the fiber (or other shaped article formed of or containing the vinyl resin) in the solution, or by spraying, padding, brushing or otherwise contacting the shaped article with the solution. In using the solution, it may be applied at room temperature (20°–30° C.), or at elevated temperatures up to, for example, 100° C. in those cases where the quaternary ammonium compound has a low degree of solubility in water or other volatile liquid medium or mixture of different liquid media being used. Upon drying the fiber or other shaped article at room temperature or at an elevated temperature, e. g., on heated drying rolls, the treated article has the aforementioned quaternary ammonium compound deposited at least on the outer surfaces thereof. The amount of quaternary ammonium compound of the kind embraced by Formula I that is present in or on the dried, treated article can be varied as desired or as conditions may require, but ordinarily it is present therein or thereon in an amount, by weight, corresponding to from about 0.2% to about 10% of the dried, untreated article.

It is not essential that the quaternary ammonium compound be used as the sole antistatic agent or effect agent which is present in the volatile liquid medium, more particularly an aqueous solution (including an aqueous dispersion). In some cases, however, it may be advantageous to use the quaternary ammonium compound alone, especially in those cases wherein the compound contains a long-chain aliphatic grouping, specifically an alkyl grouping, of sufficient length so that the compound is capable of functioning both as a lubricating agent and as an antistatic agent. In other cases it may be desirable to use the quaternary ammonium compound in conjunction with other conditioning agents that are commonly employed in finishing compositions used in treating thermoplastic vinyl resins in fiber, film or other form. Such auxiliary conditioning agents include mineral, vegetable and animal oils, among which latter may be mentioned blown and unblown neatsfoot oil, sperm oil, olive oil, teaseed oil, peanut oil, soya bean oil and cottonseed oil, as well as the various sulfonated oils, e. g., sulfonated olive oils. Examples of other conditioning agents that may be employed in combination with the quaternary ammonium compound of the kind embraced by Formula I are esters of long-chain fatty acids, e. g., alkyl stearates, palmitates and oleates, more particularly the methyl, ethyl, propyl, butyl, amyl, hexyl, etc., stearates, palmitates and oleates.

The finishing compositions containing an antistatic agent comprising a quaternary ammonium compound of the kind embraced by Formula I may be applied to the shaped thermoplastic vinyl resin, e. g., yarns of associated filaments of such a resin, in the course of the production of the yarn or other shaped article, or subsequent to the production of the yarn and before or after any textile operations in which such yarns are used, especially those operations which include or involve a winding operation. By applying the finishing composition in the course of producing the filaments or fibers, the application may suffice for subsequent textile operations. If desired, however, the finishing composition containing the described antistatic agent may be applied both during the process of producing the yarns as well as later when these yarns are fabricated into textile fabrics.

The quaternary ammonium compounds used in practicing my invention also may be applied to the thermoplastic vinyl resin when the latter are in gelled form. For example, I may apply a liquid treating agent to a fiber in gel state, more particularly an aquagel (hydrogel) state, and in which the solid phase comprises an acrylonitrile polymerization product, more particularly such a product which contains in the molecules thereof an average of at least about 85% by weight of combined acrylonitrile, which treating agent comprises an aqueous solution containing a quaternary ammonium compound of the kind embraced by Formula I. Thereafter the thusly treated, gelled fiber is dried, for example, by continuously passing the fiber over heated drying rolls as is described more fully in Cresswell Patent No. 2,558,731, dated July 3, 1951. In this way the quaternary ammonium compound imparts antistatic characteristics to the fiber both during and after drying thereof.

The quaternary ammonium compounds used in practicing the present invention are especially suitable for use in the treatment of water-swollen, oriented or unoriented fibers, films, etc., which have been produced as described in, for example, Cresswell Patent No. 2,558,730 and the aforementioned Patent No. 2,558,731, as well as in the treatment of the dried products, whereby the tendency of the dried material to accumulate static charges of electricity is obviated or minimized and a treated material which, in general, is softer to the touch is obtained. The quaternary ammonium compounds of the kind covered by Formula I also can be used in treating staple fiber of a thermoplastic vinyl resin, especially staple fibers formed of polymeric or copolymeric acrylonitrile. The volatile liquid containing the antistatic compound can be applied to the staple fiber while it is in gel state (after which the treated fiber is dried) or it can be applied to the dried staple, alone or in conjunction with other treating agents or treatments.

As has been mentioned hereinbefore, any suitable method may be employed in applying the quaternary ammonium compound or a finishing composition containing the same to the thermoplastic vinyl resin in fiber, film or other form, and it may be applied at any suitable stage of the production of the shaped article, or during its fabrication into other forms, or to the finished, fabricated article and prior to or during its service use. For example, if the conditioning agent is to be applied to the yarn after spinning, the yarn may be brought into contact with a wick, roll or felt which has been wetted with an aqueous or other solution (including dispersion) containing the quaternary ammonium compound. Alternatively, the liquid finishing composition containing the quaternary ammonium compound may be applied to the vinyl-resin article by immersing the article in a bath containing the same, or by spraying, brushing, coating or otherwise applying the finishing composition to the article. Examples of points during the production of a yarn at which the conditioning agent may be applied are during stretching of a wet-spun yarn or fiber to orient the molecules thereof, or between any of the guides or godets or other rolls employed in the spinning process, or between the guide and the point of winding and/or twisting; or, the conditioning agent may be applied to the yarn after winding onto cones, spools, bobbins or the like; or, in the case of staple-fiber manufacture, the conditioning agent may be applied to the yarn either prior to or after cutting the yarn into staple lengths. If desired, the quaternary ammonium compound which is deposited in or on the treated article may be allowed to remain in place during and after the production of the article in its ultimate form. The conditioning agent may be removed, if desired, from yarns, fabrics and the like containing the same by means of the usual aqueous scouring baths.

In order that those skilled in the art may better understand how the present invention can be carried into effect, the following examples are given by way of illustration and not by way of limitation. All parts and percentages are by weight.

*Example 1*

A skein of Vinyon N continuous-filament yarn is scoured in an aqueous solution of a reaction product of 1 mole of octylphenol with about 8–12 moles of ethylene oxide, washed with hot water and kept wet until tested as described in the following paragraph. (Vinyon N continuous-filament yarn is made from a copolymer of about 60% vinyl chloride and about 40% acrylonitrile.)

The washed, wet skein is immersed in a 2% aqueous solution of gamma-caprylamidopropyl dimethyl beta'-hydroxyethyl ammonium chloride, which is at room temperature (20°–30° C.). The skein is worked up and down in the solution, allowed to drain, air-dried, followed by drying in an oven at 105° C. The dried skein then shows no tendency to develop static electricity when stroked with the hand. This same dry skein, without the above antistatic finish, becomes readily charged with static electricity when similarly stroked under the same conditions of relative humidity.

*Example 2*

Same as in Example 1 with the exception that the skein of Vinyon N continuous-filament yarn is immersed in a 2% aqueous solution of gamma-stearamidopropyl dimethyl beta'-hydroxyethyl ammonium chloride. Substantially the same results are obtained.

*Example 3*

Same as in Example 1 with the exception that the skein of Vinyon N continuous-filament yarn is immersed in a 2% aqueous solution of gamma-lauramidopropyl dimethyl beta'-hydroxyethyl ammonium chloride, the formula for which is

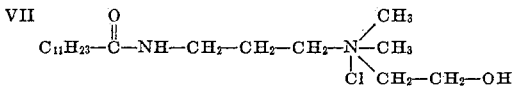

Similar results are obtained.

*Example 4*

Same as in Example 1 with the exception that the skein of Vinyon N continuous-filament yarn is immersed in a 2% aqueous solution of gamma-myristamidopropyl dimethyl beta'-hydroxyethyl ammonium chloride, the formula for which is

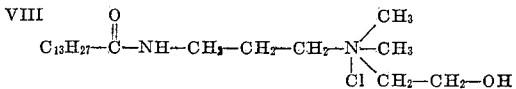

The dried skein shows no tendency to develop static electricity when stroked with the hand.

*Example 5*

Same as in Example 1 with the exception that the skein of Vinyon N continuous-filament yarn is immersed in a 2% aqueous solution of gamma-palmitamidopropyl dimethyl beta'-hydroxyethyl ammonium chloride, the formula for which is

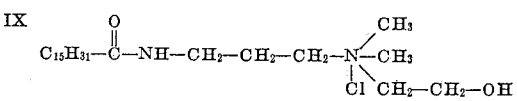

Similar results are obtained.

*Example 6*

Same as in Example 1 with the exception that the skein of Vinyon N continuous-filament yarn is immersed in a 2% aqueous solution of gamma-stearamidopropyl dimethyl beta'-hydroxyethyl ammonium phosphate. Similar results are obtained.

*Example 7*

A spinning solution is prepared by dissolving a copolymer produced from a mixture of 19 parts of acrylonitrile and 1 part of methyl acrylate in a 53% aqueous solution of calcium thiocyanate adjusted to a pH of 6.8 with dilute hydrochloric acid. The proportions are adjusted so that the spinning solution contains 7% of the said copolymer. The viscosity of this solution, as determined by measuring the time for a Monel metal ball, ⅛ inch in diameter and weighing 0.142 gram, to fall through 20 cms. of the solution maintained at 61° C., is 33.6 seconds.

The above solution is spun into fibers by extruding it through a 40-hole spinneret with holes of 110 microns diameter into a coagulating bath comprising water containing about 5% by weight thereof of calcium thiocyanate and cooled to about −1° C. The solution is heated inside the spinneret prior to extrusion by means of a steam-heated "finger."

The spun fiber is led out of the coagulating bath and thence over a treating unit comprising two, positively driven, stainless steel rolls, each of which is 4 inches in diameter and 10 inches long, and which are suspended in the same vertical plane 8 inches apart and are slightly inclined toward each other at the delivery ends thereby to advance the thread over the rolls. The wet, gelled yarn is helically wound around both rolls to form a plurality of loops or helices, the total length of the fiber on the rolls being about 18 yards. The helices of gelled fiber are washed on the rolls by applying a spray of cold water. From the delivery or take-off end of the converging wash rolls, the fiber is led to a stretch trough containing water heated to 98°–99° C. The fiber is stretched in the bath of hot water about 800%. From the stretch trough the stretched fiber is continuously led over a drying unit comprising two, positively driven, stainless steel rolls, each of which is of the same diameter and length and suspended apart in the same manner as described above with reference to the wash rolls. The drying rolls likewise are slightly inclined toward each other at the delivery end thereby to advance the thread over the rolls. Each roll is electrically heated internally so as to provide an external surface temperature of about 65°–70° C., and is rotated at a peripheral speed greater than that of the wash rolls, thereby to impart the desired stretch to the gelled fiber as it passes through the stretch trough.

At the feed-on end of either or both of the drying rolls an antistatic treating agent comprising a 2% aqueous solution of gamma-stearamidopropyl dimethyl beta'-hydroxyethyl ammonium chloride is applied, as by means of a suitable jet, to the first few helices of fiber advancing along the rolls. Any other suitable means can be used in applying the antistatic agent to the gelled fiber at any suitable stage prior to drying thereof. As a result of this treatment the continuous-filament yarn dries satisfactorily without accumulation of an electrostatic charge, as evidenced by the fact that there is no filament "ballooning" and no damage to the dried fibers or any operating difficulties during drying. Furthermore, the dried fibers have an excellent color, which is a condition that does not exist when many other antistatic agents are used, and which tend to impart color to the fiber both during the drying process and when the dried fiber is later subjected to an elevated temperature.

From the take-off end of the drying rolls the dried yarn advantageously is further heated, while in a relaxed state, in the manner described in Cresswell and Wizon Patent No. 2,558,733 dated July 3, 1951. The resulting yarn is then led to a suitable take-up device, for example a ring twister, for the insertion of twist, for instance 2.8 turns per inch S twist. The finished yarn contains from about 1 to 4%, by weight of the fiber, of the aforementioned antistatic agent. Higher or lower amounts of antistatic agent can be applied as desired or as conditions may require, but ordinarily the amount of said agent is within the range of from about 0.2% to about 10% by weight of the dried, untreated fiber.

The following are among the operating improvements which result when a quaternary ammonium compound of the kind embraced by Formula I is employed as an antistatic agent in a continuous fiber-forming process as described under Example 7, especially when it is used in conjunction with an added lubricant, e. g., butyl stearate.

1. The butyl stearate or other lubricant is so well dispersed that it is more uniformly applied to the yarn than previously was possible.
2. A lower drying temperature can be used, resulting in a less brittle yarn.
3. The yarn receives enough lubrication without being slippery, thereby giving a better package when coned.
4. More uniform retraction is obtained than previously was possible.
5. The yarn is brighter than that formerly obtained with other antistatic agents.
6. The quaternary ammonium compound is effective in very low concentrations, thus facilitating more uniform application of the antistatic agent to the yarn and giving cleaner operation of the drying rolls.

*Example 8*

Same as in Example 7 with the exception that the fiber is produced from a spinning solution comprising 7 parts of homopolymeric acrylonitrile dissolved in 93 parts of a 53% aqueous solution of calcium thiocyanate. Similar results are obtained.

*Example 9*

Same as in Example 7 with the exception that the antistatic agent comprises a 2% aqueous solution of gamma-stearamidopropyl dimethyl beta' - hydroxyethyl ammonium phosphate. Similar results are obtained.

*Example 10*

Same as in Example 7 with the exception that the antistatic agent comprises a 2% aqueous solution of gamma-stearamidopropyl dimethyl beta'-hydroxyethyl ammonium sulfate. Similar results are obtained.

*Example 11*

Same as in Example 1 with the exception that the skein of Vinyon N continuous-filament yarn, after being scoured and washed in hot water as described in that example, is treated and tested as follows:

The dried skein is immersed in a 2% aqueous solution of gamma-stearamidopropyl dimethyl beta'-hydroxyethyl ammonium chloride, which is at room temperature (20°–30° C.). The skein is worked up and down in the solution, then submerged and allowed to soak in the solution for 20 minutes. The impregnated skein is removed from the solution, allowed to drain, air-dried, and then dried in an oven at 105° C. The resulting skein shows no tendency to develop static electricity when stroked with the hand. A similarly processed dry skein of the same material, omitting the quaternary ammonium salt from the aqueous solution (that is, a so-called "blank" test for purpose of comparison) becomes readily charged with static electricity when similarly stroked under the same conditions of relative humidity and temperature.

*Example 12*

A crimped, staple fiber formed of a copolymer produced from a mixture of 19 parts of acrylonitrile and 1 part of methyl acrylate is scoured twice with a 0.05% aqueous solution of di-(ethylhexyl) sodium sulfosuccinate, washed free of scouring agent and then air-dried. The dried staple fiber is immersed in a 4% aqueous solution of gamma-stearamidopropyl dimethyl beta'-hydroxyethyl ammonium chloride, worked up and down in the solution to insure uniform application, and then allowed to soak completely submerged for a period of 20 minutes. The impregnated staple is removed from the solution, centrifuged in a small basket-type centrifuge to a wet pickup of 125–150%, air-dried, equilibrated at 50% relative humidity and 73° F. for 48 hours, and then tested as follows:

The staple fiber is laid across the top of the series of fine-toothed metal combs, arranged in parallel banks, of a Suter wool fiber length sorter, this instrument being utilized for the antistatic testing. The projecting ends of the staple tuft are grasped in a clamp, and the fiber is drawn through the metal teeth of the combs. In this way there is produced fiber-to-metal and fiber-to-fiber friction. No ballooning of the individual filaments of the staple sample held in the clamp is observed even after repeatedly combing the same portion of staple in the manner described above, thus showing that there has been no accumulation of static charges of electricity on the staple fiber. In marked contrast, the individual filaments of a sample of this same staple fiber, which has not been treated with the aforementioned quaternary ammonium salt but otherwise has been processed and tested in the same manner, readily accumulate static charges of electricity as evidenced by the fact that they balloon apart severely when subjected to the aforementioned combing operation.

Example 13

Same as in Example 12 with the exception that the sample of staple fiber tested is formed of a homopolymer of acrylonitrile, and the scoured, washed and air-dried sample is immersed in a 2% aqueous solution of gamma-lauramidopropyl dimethyl beta'-hydroxyethyl ammonium chloride. Substantially the same results are obtained.

Example 14

In this example, too, a staple fiber formed of homopolymeric acrylonitrile is used. Otherwise the procedure and method of testing are the same as that described under Example 12 with the exception that the scoured, washed and air-dried sample is immersed in a 2% aqueous solution of gamma-myristamidopropyl dimethyl beta'-hydroxyethyl ammonium chloride. Similar results are obtained.

Example 15

Same as in Example 12 with the exception that the sample of staple fiber tested is formed of a copolymer of about 60% vinyl chloride and about 40% acrylonitrile, and the scoured, washed and air-dried sample is immersed in a 2% aqueous solution of gamma-palmitamidopropyl dimethyl beta'-hydroxyethyl ammonium chloride. Substantially the same results are obtained.

Example 16

Same as in Example 1 with the exception that the yarn treated is a homopolymeric acrylonitrile continuous-filament yarn (a commercial grade of product), which, after being scoured and washed in hot water as described in that example, is treated and tested as described in Example 11. The skein of yarn, after being impregnated with the aqueous solution of gamma-stearamidopropyl dimethyl beta'-hydroxyethyl ammonium chloride, drained, air-dried and over-dried at 105° C., shows little or no tendency to develop static electricity when stroked with the hand. In marked contrast, a similarly processed dry skein of the same material, omitting the quaternary ammonium salt from the aqueous solution, becomes readily charged with static electricity when similarly stroked under the same conditions of relative humidity and temperature.

Example 17

Same as in Example 16 with the exception that the antistatic treating agent is a 2% aqueous solution of gamma-caprylamidopropyl beta'-hydroxyethyl ammonium chloride. Similar results are obtained.

It will be understood, of course, by those skilled in the art that my invention is not limited to the particular quaternary ammonium compounds, the particular vinyl resins or the particular conditions of applying the former to the latter as given in the above illustrative examples. For example, in place of the particular quaternary ammonium compound named in the individual examples, any other quaternary ammonium compound, or mixture of compounds, of the kind embraced by Formula I can be used. I prefer to use a stearamidopropyl dimethyl hydroxyethyl ammonium salt, more particularly a gamma-stearamidopropyl dimethyl beta'-hydroxyethyl ammonium salt.

Likewise it will be understood by those skilled in the art that the invention is not limited to the treatment of the specific vinyl resins given by way of illustration in the foregoing examples, since, to the best of my knowledge and belief, any thermoplastic vinyl resin which in its dry state normally accumulates or tends to accumulate static charges of electricity is amenable to treatment with a quaternary ammonium compound (or mixture of quaternary ammonium compounds) of the kind embraced by Formula I to obviate or minimize the accumulation of static charges of electricity thereon. Numerous examples of such vinyl resins have been given hereinbefore.

As has been indicated in a portion of this specification prior to the examples, the preferred vinyl resin which is subjected to treatment in accordance with this invention is polymeric acrylonitrile or copolymeric acrylonitrile containing in its molecules a substantial amount of combined acrylonitrile. Of such copolymeric acrylonitriles, I prefer to treat an acrylonitrile copolymer containing in the polymer molecules an average of at least 85% by weight of combined acrylonitrile. In such copolymeric polymerization products, the proportions of monomers in the polymerizable mixture from which the copolymers are made preferably are adjusted so that the final copolymer contains in the molecules thereof an average of at least 85% by weight of acrylonitrile (combined acrylonitrile). The expression "acrylonitrile polymerization product containing in the molecules thereof an average of at least 85% by weight of combined acrylonitrile," as used herein and in certain of the appended claims, means a polymerization product (polymer, copolymer or interpolymer or mixture thereof) containing in its molecules an average of at least 85% by weight of the acrylonitrile unit, which is considered to be present in the individual polymer molecule as the group

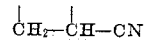

or, otherwise stated, at least 85% by weight of the reactant substance converted into and forming the polymerization product is acrylonitrile (combined acrylonitrile). Examples of monomers which may be employed in the preparation of such copolymers of acrylonitrile have been given hereinbefore.

The use of quaternary ammonium compounds of the kind embraced by Formula I in the treatment of thermoplastic vinyl resins to obviate or lessen the tendency of such resins to accumulate charges of electricity thereon has numerous advantages, some of which have been mentioned hereinbefore. Other advantages include their relatively lower cost as compared with other antistatic agents which have been suggested for this same general purpose; the fact that they do not form insoluble compounds when dissolved or dispersed in hard water; their compatibility with other conditioning agents commonly employed in finishing compositions used in treating fibers and other shaped articles formed of or containing a vinyl resin; their ease of removal from the treated article, when such removal appears to be desirable for subsequent processing or use of the article; their non-harmful effect upon the thermoplastic vinyl resin which is subjected to treatment; as well as other advantages.

The term "yarn" as used generically herein and in the appended claims includes within its meaning a single filament, a plurality of filaments associated into the form of a thread and which may be of any desired twist, single or multiple threads associated or twisted together, as well as staple fibers produced from filaments or threads and spun yarn produced from such staple fibers. The term "fiber" as used generically herein and in the appended claims includes within its meaning both monofilaments and multifilaments.

I claim:

1. The method of conditioning a shaped article comprising a thermoplastic vinyl resin to lessen its tendency to accumulate static charges of electricity thereon, said method comprising applying to the said article a volatile liquid containing a quaternary ammonium compound represented by the general formula

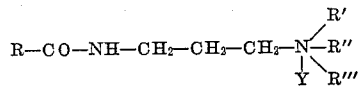

wherein R is a member of the group consisting of aliphatic and alicyclic radicals containing at least 7 carbon atoms, R' and R" are members of the group consisting of alkyl and hydroxyalkyl radicals having from 1 to 3 carbon atoms, inclusive, R''' is a hydroxyalkyl radical having from 1 to 3 carbon atoms, inclusive, and Y is an anion, and the amount of the said liquid containing the said quaternary ammonium compound which is applied to the said article being such that the finished article has associated therewith from, by weight, 0.2% to 10% of the said quaternary ammonium compound, based on the weight of the dry, untreated article, and drying the thusly treated article.

2. A method as in claim 1 wherein the thermoplastic vinyl resin contains in its molecules a substantial amount of combined acrylonitrile.

3. A method as in claim 1 wherein the quaternary ammonium compound comprises stearamidopropyl dimethyl β-hydroxyethyl ammonium chloride.

4. A method as in claim 1 wherein the quaternary ammonium compound comprises stearamidopropyl dimethyl β-hydroxyethyl ammonium phosphate.

5. The method of conditioning a yarn comprising fibers of a thermoplastic product of polymerization of a polymerizable mass comprising a preponderant proportion by weight of acrylonitrile to lessen its tendency to accumulate static charges of electricity thereon, said method comprising contacting the said yarn with an aqueous solution containing a quaternary ammonium compound represented by the general formula

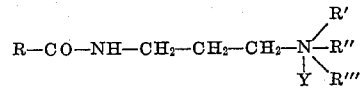

wherein R is a member of the group consisting of aliphatic and alicyclic radicals containing at least 7 carbon atoms, R' and R" are members of the group consisting of alkyl and hydroxyalkyl radicals having from 1 to 3 carbon atoms, inclusive, R''' is a hydroxyalkyl radical having from 1 to 3 carbon atoms, inclusive, and Y is halogen, and drying the thusly treated yarn, the amount of the said solution which is applied to the said yarn being such that the dried yarn has associated therewith from, by weight, 0.2% to 10% of the said quaternary ammonium compound, based on the weight of the dried, untreated yarn.

6. The method of treating fibers of a thermoplastic product of polymerization of a polymerizable mass comprising at least about 85% by weight of acrylonitrile to impart antistatic characteristics thereto, said method comprising contacting the said fibers with an aqueous solution containing an antistatic agent comprising stearamidopropyl dimethyl β-hydroxyethyl ammonium chloride, and drying the thusly treated fibers, the amount of the said solution which is applied to the said fibers being such that the dried fibers have associated therewith from, by weight, 0.2% to 10% of the said stearamidopropyl dimethyl β-hydroxyethyl ammonium chloride, based on the weight of the dried, untreated fibers.

7. The method which comprises applying a liquid treating agent to a fiber in gel state and in which the solid phase comprises an acrylonitrile polymerization product containing in the molecules thereof an average of at least about 85% by weight of combined acrylonitrile, said treating agent comprising an aqueous solution containing a quaternary ammonium compound represented by the general formula

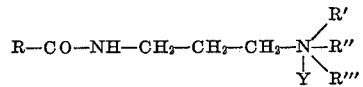

wherein R is a member of the group consisting of aliphatic and alicyclic radicals containing at least 7 carbon atoms, R' and R" are members of the group consisting of alkyl and hydroxyalkyl radicals having from 1 to 3 carbon atoms, inclusive, R''' is a hydroxyalkyl radical having from 1 to 3 carbon atoms, inclusive, and Y is chlorine, and drying the thusly treated, gelled fiber, the said quaternary ammonium compound imparting antistatic characteristics to the said fiber during and after drying thereof, and the amount of the said treating agent which is applied to the said fiber being such that the dried fiber has associated therewith from, by weight, 0.2% to 10% of the said quaternary ammonium compound, based on the weight of the dried, untreated fiber.

8. A shaped article comprising a thermoplastic vinyl resin which in a dry state normally has a tendency to accumulate static charges of electricity thereon, said article having deposited at least on outer surfaces thereof a quaternary ammonium compound represented by the general formula

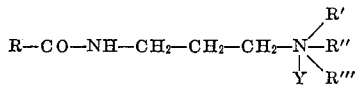

wherein R is a member of the group consisting of aliphatic and alicyclic radicals containing at least 7 carbon atoms, R' and R'' are members of the group consisting of alkyl and hydroxyalkyl radicals having from 1 to 3 carbon atoms, inclusive, R''' is a hydroxyalkyl radical having from 1 to 3 carbon atoms, inclusive, and Y is an anion, and said quaternary ammonium compound lessening the tendencies of the said article to accumulate static charges of electricity thereon and being associated with the said article in an amount corresponding to from 0.2% to 10% of the weight of the dry, untreated article.

9. A textile formed of fibers including fibers of a thermoplastic product of polymerization of polymerizable vinyl compound including acrylonitrile, said textile in a dry state normally having a tendency to accumulate static charges of electricity thereon and, to lessen this tendency, having deposited at least on outer surfaces thereof an antistatic agent comprising a quaternary ammonium compound represented by the general formula

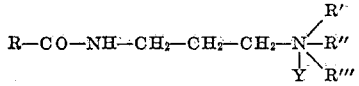

wherein R is a member of the group consisting of aliphatic and alicyclic radicals containing at least 7 carbon atoms, R' and R'' are members of the group consisting of alkyl and hydroxyalkyl radicals having from 1 to 3 carbon atoms inclusive, R''' is a hydroxyalkyl radical having from 1 to 3 carbon atoms, inclusive and Y is chlorine, the amount of the said quaternary ammonium compound which is associated with the said textile corresponding to from 0.2% to 10% of the weight of the dry, untreated textile.

10. A textile formed of fibers including fibers of a thermoplastic product of polymerization of polymerizable vinyl compound including acrylonitrile, said textile in a dry state normally having a tendency to accumulate static charges of electricity thereon and, to lessen this tendency, having deposited at least on outer surfaces thereof an antistatic agent comprising stearamidopropyl dimethyl $\beta$-hydroxyethyl ammonium phosphate, the amount of the said stearamidopropyl dimethyl $\beta$-hydroxyethyl ammonium phosphate which is associated with the said textile corresponding to from 0.2% to 10% of the weight of the dry, untreated textile.

11. Textile fibers formed of an acrylonitrile polymerization product containing in the molecules thereof an average of at least about 85% by weight of combined acrylonitrile, said fibers having deposited at least on outer surfaces thereof a conditioning agent comprising stearamidopropyl dimethyl $\beta$-hydroxyethyl ammonium chloride, which compound lessens the tendencies of the said fibers to accumulate static charges of electricity thereon and constituting from 0.2% to 10% of the weight of the dry, untreated fibers.

JOSEPH J. CARNES.

REFERENCES CITED

The following references are of record in the file of this patent:

UNITED STATES PATENTS

| Number | Name | Date |
|--------|------|------|
| 2,463,282 | Kang | Mar. 1, 1949 |
| 2,581,836 | Cresswell | Jan. 8, 1952 |